United States Patent [19]

Haka

[11] Patent Number: 5,016,521
[45] Date of Patent: May 21, 1991

[54] SELF-ADJUSTING SERVO MECHANISM FOR ACTUATING A FRICTION BAND ASSEMBLY IN A PLANETARY GEAR SET

[75] Inventor: Raymond J. Haka, Rochester, Mich.

[73] Assignee: General Motors Corporation, Detroit, Mich.

[21] Appl. No.: 481,539

[22] Filed: Feb. 20, 1990

[51] Int. Cl.$^5$ .................. F01B 31/14; F15B 15/24
[52] U.S. Cl. ............................ 92/13.1; 92/60; 92/84; 92/130 R; 92/75; 92/DIG. 4; 188/77 R
[58] Field of Search ............ 92/50, 69, 75, 62, 63, 92/82, 84, 85 A, 129, 60, 130 D, 132, 142, 13.6, 13.1, 13; 91/170 R, 173; 475/146, 148; 74/868, 869; 188/77 R; 60/562, 591, 592, 564, 568

[56] References Cited

U.S. PATENT DOCUMENTS

| | | | |
|---|---|---|---|
| 2,636,578 | 4/1953 | Swift | 188/77 R |
| 2,740,258 | 4/1956 | Weber | 60/591 |
| 2,961,831 | 11/1960 | Brueder | 60/564 |
| 3,004,390 | 10/1961 | Duffy | 188/77 R |
| 3,819,021 | 6/1974 | Schacher et al. | 91/517 |
| 3,830,061 | 8/1974 | Severinsson | 60/568 |
| 3,995,721 | 12/1976 | Chambers | 92/13.6 |
| 4,093,184 | 6/1978 | Wieschel | 60/592 |
| 4,175,651 | 11/1979 | Montalvo et al. | 192/85 AP |
| 4,471,614 | 9/1984 | Hart | 60/591 |
| 4,601,233 | 7/1986 | Sugano | 92/63 |
| 4,604,914 | 8/1986 | Fisher | 74/81 |
| 4,726,190 | 2/1988 | Van Marcke | 60/591 |
| 4,881,453 | 11/1989 | Armstrong | 74/868 |
| 4,930,373 | 6/1990 | Nakawaki et al. | 92/62 |

Primary Examiner—John T. Kwon
Assistant Examiner—Thomas Denion
Attorney, Agent, or Firm—Donald F. Scherer

[57] ABSTRACT

The present invention is directed to a self-adjusting servo mechanism (10). That is, the servo pin (30) presented from the servo mechanism (10) will protract sufficiently to effect operative engagement of a friction band assembly (13) with a rotating member (18) in a planetary gear set—even though the required axial displacement of the servo pin (30) during such protraction may exceed the axial displacement available to the actuating piston (33). The servo mechanism (10) is incorporated in a housing (20). The housing (20) presents a socket cavity (24) within which an actuating piston (33) is received for axial displacement through a predetermined distance. The servo pin (30) is supported by the housing (20) for axial reciprocation, and a coupling means (35) is interposed between the servo pin (30) and the actuating piston (33) operatively to protract the servo pin (30) in response to displacement of the actuating piston (33). The coupling means (35) is axially extensible within a predetermined range automatically to effect that displacement of the servo pin (30) required to actuate the friction band assembly (13). As such, the servo mechanism (10) is self-adjusting.

4 Claims, 3 Drawing Sheets

SELF-ADJUSTING SERVO MECHANISM FOR ACTUATING A FRICTION BAND ASSEMBLY IN A PLANETARY GEAR SET

TECHNICAL FIELD

The present invention relates generally to servo mechanisms employed in conjunction with planetary gear sets. More particularly, the present invention relates to servo mechanisms employed operatively to engage and release the one or more friction band assemblies of the type generally associated with planetary gear sets. Specifically, the present invention relates to a servo mechanism that is self-adjusting.

BACKGROUND OF THE INVENTION

Automatic vehicular transmissions are often provided with a planetary gear train, which includes one or more planetary gear sets, each of which may utilize braking bands and other torque control devices frictionally to engage and release selected members of each planetary gear set in order to obtain the desired function of the planetary gear train. The operator selects the drive range, neutral, forward or reverse, and the transmission automatically changes gear ratios in relation to the vehicle speed and the engine torque input, as permitted within the selected drive range.

A planetary gear set consists of a center or sun gear, an internal gear and a planetary carrier assembly which includes and supports the smaller planet gears or pinions. When the sun gear is held stationary and power is applied to the internal gear, the planetary gears rotate in response to the power applied to the internal gear and thus "walk" circumferentially about the fixed sun gear to effect rotation of the carrier assembly in the same direction as the direction in which the internal gear is being rotated.

When any two members of the planetary gear set rotate in the same direction and at the same speed, the third member is forced to turn at the same speed. For example, when the sun gear and the internal gear rotate in the same direction and at the same speed, the planet gears do not rotate about their own axes but rather act as wedges to lock that planetary gear set together so that it rotates as a unit.

Whenever the carrier assembly is restrained from spinning freely, and power is applied to either the sun gear or the internal gear, the planet gears act as idlers. In that way, the driven member is rotated in the opposite direction as the drive member. When, for example, the reverse drive range is selected, a band assembly may be actuated frictionally to engage the carrier assembly and restrain it against rotation so that torque applied to the sun gear will turn the internal gear in the opposite direction in order to reverse the rotational direction of the drive wheels, and thereby, reverse the direction of the vehicle itself. The present invention relates to servo mechanisms of the type employed to engage and release typical friction band assemblies.

Such a servo mechanism typically incorporates a piston assembly. The piston assembly is normally operated by the introduction of pressurized hydraulic fluid which displaces a piston to protract a servo pin the predetermined distance necessary operatively to effect engagement of the friction band assembly with the selected member of a planetary gear set. As the hydraulic fluid exits the piston assembly, the servo pin retracts to its original position and thereby allows the friction band assembly to release the selected member of the planetary gear set. The length of the servo pin is therefore selected so that it will operate the friction band assembly selectively to engage or release a rotating element in a planetary gear set in response to that axial displacement of the servo pin effected by the piston assembly.

In the configuration heretofore described, an actuating piston is included in the piston assembly, and the actuating piston axially reciprocates between its release position and its apply position. The distance between its release position and its apply position constitutes the throw or axial displacement of the actuating piston. The fixed connection between the actuating piston and the servo pin is such that when the actuating piston has reached its release position, the servo pin will be in its retracted position—which allows the friction band assembly to release the member of the planetary gear set upon which it operates. Conversely, when the actuating piston has reached its apply position the servo pin will be in its protracted position—which causes the friction band assembly to tighten onto the member of the planetary gear set upon which the friction band assembly operates. As the friction band assembly thus engages the selected member of the planetary gear set, rotation of that member is thereby precluded.

In most automatic transmission assemblies, the band servo system does not permit direct adjustment. In these systems, however, the servo pin length is selected, for each transmission, at assembly to accommodate the production tolerances. With these systems, it is necessary to inventory a number of servo pins and to measure elements of each transmission assembly prior to the final assembly of the servo mechanism. While these systems have some wear throughout the life of the transmission, the effect of the wear is not significant nor noticeable under most operating conditions.

In some automatic transmission assemblies, however, a mechanical adjustment is available at the connection between the friction band assembly and the transmission casing from which the friction band assembly is supported. The mechanical adjustment of the friction band assembly constitutes a convenient means by which to establish optimum operation of the friction band assembly within the range of axial displacement available to the servo pin by reciprocation of the actuating piston. Such adjustments are highly desirable during assembly of the transmission, and—because of the normal wear incident to the friction band assembly—it has heretofore been required that periodic, manual adjustments be made during the operational life of the transmission. Unless some periodic adjustments are made, the quality of the shift effected by the transmission can degrade.

SUMMARY OF THE INVENTION

It is, therefore, a primary object of the present invention to provide an improved servo mechanism that is self-adjusting.

It is another object of the present invention to provide an improved servo mechanism, as above, wherein the servo pin will protract sufficiently to operate the friction band assembly even though the required axial displacement of the servo pin during such protraction may exceed the axial displacement available to the actuating piston.

It is a further object of the present invention to provide an improved servo mechanism, as above, wherein axial displacement of the servo pin during retraction will always be substantially equal to the axial displacement of the actuating piston.

It is yet another object of the present invention to provide an improved servo mechanism, as above, wherein an axially extensible coupling means is operatively interposed between the servo pin and the actuating piston.

It is an even further object of the present invention to provide an improved servo mechanism, as above, wherein axial extension of the coupling means is accomplished by hydraulic means.

These and other objects of the invention, as well as the advantages thereof over existing and prior art forms, which will be apparent in view of the following detailed specification, are accomplished by means hereinafter described and claimed.

In general, a servo mechanism embodying the concepts of the present invention is self-adjusting. That is, the servo pin will protract sufficiently to effect operative engagement of a friction band assembly with a rotating member in a planetary gear set—even though the required axial displacement of the servo pin during such protraction may exceed the axial displacement available to the actuating piston. Conversely, the servo pin will retract through a distance substantially equal to the displacement of the actuating piston.

An exemplary construction for a self-adjusting servo mechanism adapted to accomplish the foregoing results may be incorporated in a housing. The housing presents a socket cavity within which an actuating piston is received for axial displacement through a predetermined distance. A servo pin is supported by the housing for axial reciprocation, and a coupling means is interposed between the servo pin and the actuating piston operatively to protract the servo pin in response to displacement of the actuating piston. The coupling means is axially extensible within a predetermined range automatically to effect that displacement of the servo pin required to actuate the friction band assembly. As such, the servo mechanism is self-adjusting.

One exemplary servo mechanism embodying the concepts of the present invention is shown by way of example in the accompanying drawings and is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
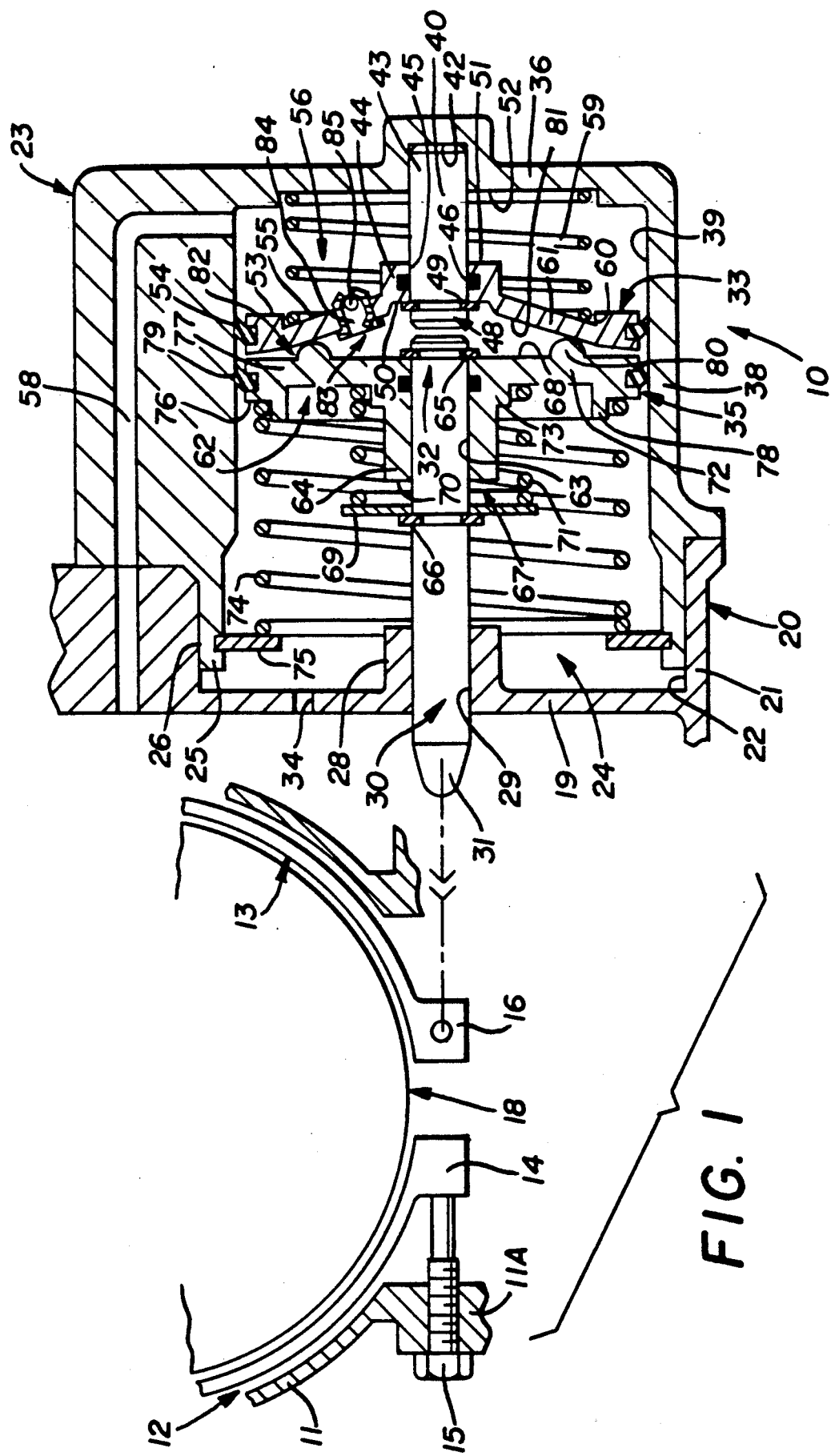
FIG. 1 is a cross-sectional view of a servo mechanism embodying the concepts of the present invention, with the servo pin being depicted in its maximum retracted position.

One representative form of a servo mechanism embodying the concepts of the present invention is designated generally by the numeral 10 on the accompanying drawings. The representative servo mechanism 10 may be operatively secured to, or it may be integrally incorporated within, the casing 11 of a vehicular transmission. The mechanism of one or more planetary gear sets is housed within the cavity 12 located interiorly of the casing 11. Inasmuch as planetary gear sets are well known in the art, only that element of the planetary gear set to which the servo mechanism 10 is operatively connected has been depicted in the drawings, and then schematically.

With reference to FIG. 1, a friction band assembly 13 is depicted with one end portion 14 thereof being secured to a relevant portion 11A of the transmission casing 11. Although the necessity for periodic, manual adjustments has been obviated by the present invention, it may be desirable to provide a means by which to facilitate installation, and initial set-up of the friction band assembly 13 during construction of the transmission. Accordingly, the end portion 14 of the friction band assembly 13 may be adjustably secured, as by the set screw 15, to portion 11A of the transmission casing 11.

The other end portion 16 of the friction band assembly 13 may be operatively connected to the servo mechanism 10 in a manner well known to the art and therefore not detailed or further explained. Operation of the friction band assembly 13 by the servo mechanism 10, as is generally hereinafter more fully explained, selectively engages a desired member 18 in the planetary gear set to preclude rotation thereof or releases the member 18 to permit rotation thereof. Typically, the servo mechanism 10 would selectively operate the friction band assembly 13 to co-act with the carrier assembly which supports the pinions of a planetary gear set. Member 18, as depicted, may thus be schematically representative of a carrier assembly in a planetary gear set.

Continuing with specific reference to FIG. 1, a transverse base wall 19 is incorporated in a servo housing 20. The housing 20 may be operatively secured to the transmission case 11, or it may be integrally included within the casing 11, as is well known to the art. In either event, a pedestal 21 may extend outwardly from the transverse base wall 19. A cylindrical surface 22 preferably defines the radially interior perimeter of the pedestal 21. A cover or closure cap 23 cooperates with the pedestal 21 to complete the housing 20 and to define a socket cavity 24 interiorly of the housing 20. To stabilize the connection of the cover 23 to the pedestal 21, and to assist in sealing the socket cavity 24 from atmosphere, an annular extension 25 may extend axially outwardly from the cover 23. The cylindrical outer surface 26 on the extension 25 is adapted matingly to engage the cylindrical interior surface 22 of the pedestal 21. Suitable sealing and connecting means, not shown, may be employed between the housing 20 and the cover 23.

A boss 28 extends axially inwardly of the socket cavity 24 from the transverse base wall 19 of the housing 20, and a pilot bore 29 penetrates the boss 28 and base wall 19. The pilot bore 29 is aligned, not only with the axis of the socket cavity 24, but also with the second end portion 16 of the friction band assembly 13. A servo pin 30 is supported by the housing 20. Specifically, the servo pin 30 may be received within the pilot bore 29 for sliding, axial reciprocation. That end 31 of the servo pin 30 disposed exteriorly of the housing 20 is operatively connected to end portion 16 of the friction band assembly 13. The opposite end portion 32 of the servo pin 30 is operatively connected to an actuating piston 33, as by an axially extensible, hydraulic coupling means 35 hereinafter more fully described. An exhaust passage 34 prevents fluid pressure from developing in the cavity 24 adjacent the servo pin 30.

The cover 23 may be configured with a transverse end wall 36 conjoined to a perimeter wall 38. The hollow interior of both the cover 23 and the pedestal 21 combine to form the socket cavity 24. The interior surface 39 of at least that portion of the socket cavity 24 circumscribed by the cover 23 is preferably cylindrical and defines the circumference of a chamber within which the actuating piston 33 may axially reciprocate.

The actuating piston 33 is preferably mounted for reciprocation along an axially oriented stub shaft 40 which extends outwardly from the cover 23 in substantially cantilevered fashion to serve as a guide for the actuating piston 33. A cylindrical pocket 42 is recessed into the transverse end wall 36 of the cover 23, and the first end portion 43 of the stub shaft 40 is anchored within the pocket 42. The hub portion 44 of the actuating piston 33 is penetrated by a bore 45 which slidingly engages the stub shaft 41. A seal 46 is received within a groove which extends circumferentially within the bore 45. The seal 46 precludes the passage of hydraulic fluid between the stub shaft 41 and the hub portion 44 of the actuating piston 33.

The unsupported, second end portion 48 of the stub shaft 40 is circumferentially grooved to receive a retaining ring 49. With the stub shaft 40 secured within the pocket 42, the retaining ring 49 is positioned to engage the surface 50 which constitutes the underside of the hub portion 44. The retaining ring 49 thereby serves as a stop which defines the apply position in the axial displacement of the actuating piston 33. The oppositely facing surface 51, which constitutes the topside of the hub portion 44, is positioned to engage the opposed surface 52 on the transverse end wall 36 of the cover 23. The surface 52 thus serves as a stop which defines the release position in the axial displacement of the actuating piston 33. The functions of the release position and apply position will also be hereinafter more fully described.

The peripheral skirt portion 53 of the actuating piston 33 is provided with a radially outwardly directed, circumferential recess to receive a seal 54 which cooperates with the cylindrical interior surface 39 of the cover 23 to preclude leakage of hydraulic fluid between the skirt portion 53 and the cover 23.

That side of the actuating piston 33 which faces the transverse end wall 36 of the cover 23 comprises a first head surface 55, and that portion of the socket cavity 24 between the first head surface 55 on the actuating piston 33 and the transverse end wall 36 of the cover 23 comprises a pressure chamber 56.

A feed line, identified generally by the numeral 58, communicates between a source (not shown) of pressurized hydraulic fluid and the pressure chamber 56.

A tickler spring 59 is also received within the pressure chamber 56. The transverse end wall 36 of the cover 23 may be recessed to receive, and locate, one end of the tickler spring 59, and the other end of the tickler spring 59 may be received within an offset 60 which defines the intersection between the web wall 61 of the actuating piston 33 and the skirt portion 53 thereof.

As previously noted, the servo pin 30 is operatively connected to the actuating piston 33 by virtue of the expandable coupling means 35. Specifically, a drive piston 62 is secured to the second end portion 32 of the servo pin 30. A bore 63 penetrates the hub portion 64 of the drive piston 62, and the second end portion 32 of the servo pin 30 is received within the bore 63 for limited axial displacement. The limited axial displacement effects the hereinafter described lost motion connection identified generally by the numeral 67. A pair of axially spaced grooves receive first and second retaining rings 65 and 66, respectively. The first retaining ring 65 is located in close proximity to the second end portion 32 of the servo pin 30. The head surface 68 on the drive piston 62 is adapted to engage the first retaining ring 65 during certain operational stages of the servo mechanism 10. A reaction ring 69 is supported against the second retaining ring 66 and as such, is disposed between the opposite end surface 70 on the hub portion 64 of the drive piston 62 and the second retaining ring 66.

As depicted in the several figures, the axial span between the head surface 68 and the end surface 70 is modestly less than the axial dimension between the first and second retaining rings 65 and 66 to effect the lost motion in the connection 67 between the servo pin 30 and the drive piston 62. A compression type cushion spring 71 is interposed between the web wall 72 of the drive piston 62 and the reaction ring 69. To stabilize and locate the cushion spring 71, the hub portion 64 may have a transitional portion 73 that is of sufficient diameter to fit within the cushion spring 71 in order to preclude lateral displacement thereof. A return spring 74 is disposed radially outwardly of the cushion spring 71. One end of the return spring 74 engages a reaction ring 75 that may be anchored within a notch that extends around the interior circumference of the extension 25 on the cover 23. The opposite end of the return spring 74 engages an opposed surface 76 on the skirt portion 77 of the drive piston 62 and is stabilized against lateral displacement by an annular extension 78 which extends axially from the skirt portion 77 to be circumscribed by the return spring 74.

A seal 79 is received within a recess on the radially outermost circumference of the skirt portion 77 to preclude the passage of hydraulic fluid between the drive piston 62 and the cylindrical interior surface 39 of the cover 23. Any fluid which inadvertently leaks by the seal 79 is exhausted through the passage 34.

A spacer 80, which may comprise a plurality of circumferentially spaced protuberances, or even a single annular ring, extends axially outwardly from the web wall 72 of the drive piston 62 to engage the second head surface 81 on the actuating piston 33 to determine the closest proximity to which the two pistons 33 and 62 may approach each other.

That portion of the socket cavity 24 which is disposed between the drive piston 62 and the second head surface 81 on the actuating piston 33 comprises an accumulating chamber 82.

A control means 83 is provided to permit only unidirectional flow of hydraulic fluid from the pressure chamber 56 into the accumulating chamber 82. Specifically, a passage 84 penetrates the web wall 72 of the actuating piston 33, and a check valve 85 is received within the passage 84.

OPERATION

With reference to FIG. 1, the actuating piston 33 is depicted at its apply position, but the servo pin 30 is depicted in its fully retracted position. This condition exists when the servo mechanism 10 is first installed—i.e.: when there is no hydraulic fluid within either the pressure chamber 56 or the accumulating chamber 82. As such, this condition exists before the coupling means 35 has been axially extended. With no hydraulic fluid within either of the pressure or accumulating chambers 56 or 82, respectively, the tickler spring 59 applies a biasing pressure to the actuating piston 33 which is sufficient to overcome any drag of the seal 54 against the cylindrical surface 39 and force the actuating piston 33 along the stub shaft 46 to its apply position. When the actuating piston is in its apply position the surface 50 on the underside of the hub 44 on actuating piston 33 engages the retaining ring 49.

Simultaneously, the compression spring which serves as the return spring 74 expands to its full length, and that displaces the drive piston 62 until it lies in virtually contiguous juxtaposition with the actuating piston 33. With the return spring 74 fully extended, as depicted in FIG. 1, the spacer 80 on the web wall 72 of the drive piston 62 would desirably engage the second head surface 81 on the web wall 61 of the actuating piston 33. With the drive piston 62 so disposed, the cushion spring 71 drives the retaining ring 65 on end portion 32 of the servo pin 30 into engagement with the head surface 68 on the drive piston 62. This establishes the disposition of the lost motion connection 67 to prevent abrupt protraction of the servo pin 30, as will be hereinafter more fully described.

Figure 2:
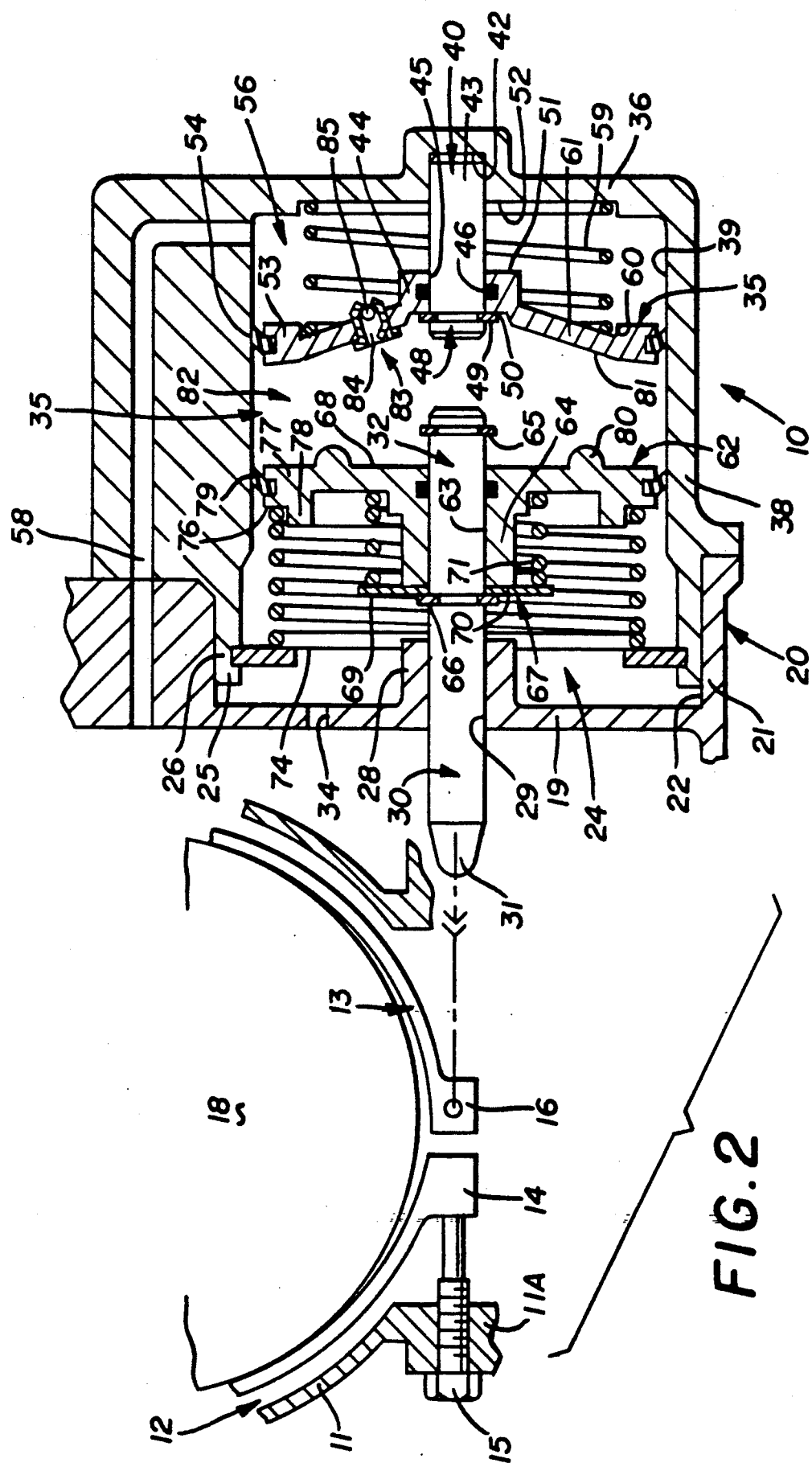
FIG. 2 is a cross-sectional view similar to FIG. 1, but depicting the servo pin in a protracted position; and, FIG. 3 is a cross-sectional view similar to FIGS. 1 and 2, but with the servo pin being depicted in a representative retracted position which would result after the hydraulic coupling means has been longitudinally extended.

In order to actuate the servo mechanism 10, pressurized hydraulic fluid is introduced, via feed line 58, into chamber 56. As the pressure chamber 56 fills, the hydraulic fluid flows from the pressure chamber 56, past check valve 85 and through passage 84 into the accumulating chamber 82. With the check valve 85 thus open, any entrapped air may escape past the hydraulic fluid as it is introduced. As the volume of hydraulic fluid within the accumulating chamber 82 increases, the drive piston 62 compresses the cushion spring 71 to bring the end surface 70 on the hub 64 against the reaction ring 69. The energy necessary to compress the spring 71 cushions the application of the force applied by the drive piston 62 to initiate protraction of the servo pin 30. So long as pressurized hydraulic fluid is being admitted through the feed line 85 the servo pin 30 will continue to protract until, as represented in FIG. 2, the friction band assembly 13 has firmly tightened onto, and has thereby precluded rotation of, the member 18 in the planetary gear set. As will be apparent from viewing FIG. 2, axial expansion of the accumulating chamber 82 effects whatever extension of the coupling means 35 is required automatically, and progressively, to protract the servo pin 30 to the extent necessary to accommodate any wear between the co-acting friction band assembly 13 and the member 18 of the planetary gear set.

To continue with the operational explanation, at that stage in the operation of the planetary gear train when the member 18 is to rotate, the hydraulic fluid is permitted to exhaust from the pressure chamber 56, also through feed line 58. During that process, the biasing action of the compression spring 74 displaces the drive piston 62 to permit retraction of the servo pin 30. However, because the control means 83 permits only unidirectional flow of hydraulic fluid from the pressure chamber 56 into the accumulating chamber 82, the hydraulic fluid within the accumulating chamber 82 will be retained therein, even though all the hydraulic fluid may have been exhausted from the pressure chamber 56. Because the accumulation chamber 82 remains extended, the return spring 74 is thereby also able to displace the actuating piston 33 and drive the topside surface 51 on the actuating piston 33 into contact with the opposed surface 52 on the transverse end wall 36 of the cover 23. This disposition is depicted in FIG. 3.

Figure 3:
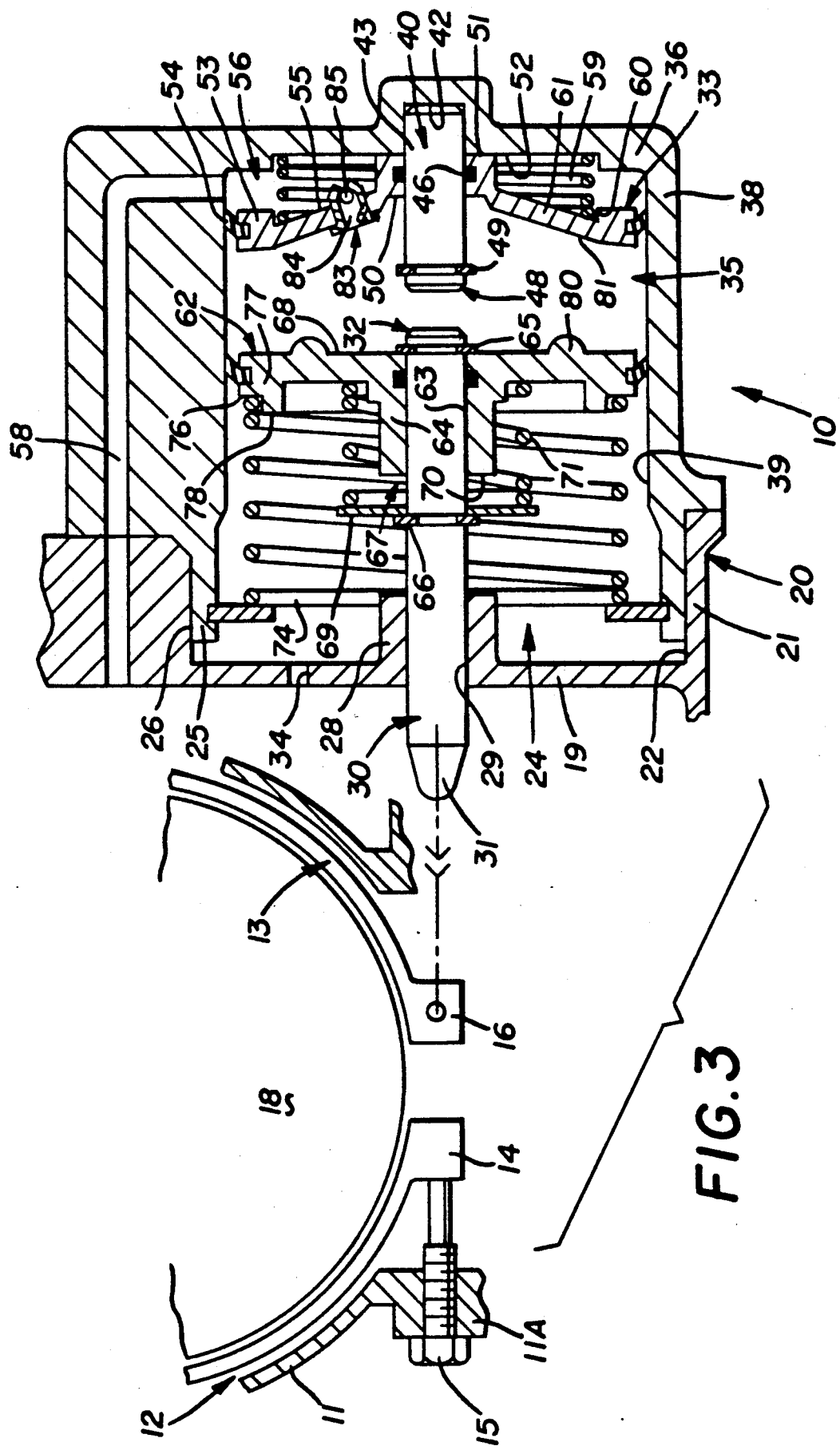

Under normal conditions, operation of the friction band assembly 13 to preclude rotation of the planetary gear member 18 occurs when the components of the servo mechanism 10 are disposed by displacing the components from the position depicted in FIG. 3 to the position depicted in FIG. 2. This displacement merely requires admission of hydraulic fluid through feed line 58 into pressure chamber 56. By thus admitting hydraulic fluid into the pressure chamber 56 the actuating piston 33 will be displaced from its release position (FIG. 3) to its apply position (FIG. 2) to protract the servo pin 30 a sufficient distance to accomplish the desired result. Should any hydraulic fluid have leaked out of the accumulating chamber 82 it will automatically readjust during the next cycle of introducing hydraulic fluid into the pressure chamber 56. Similarly, at any time that sufficient wear occurs to the friction band assembly 13, or the member 18 with which the friction band assembly co-acts which would preclude proper operation of the friction band assembly 13, the accumulating chamber 82 will automatically expand axially to provide the protraction necessary for the proper operation of the servo mechanism 10.

Thus, no matter what protraction is required, the actuating piston 33 need merely be displaced from its release position to its apply position. The hydraulic coupling means 35 will provide whatever further protraction is required of the servo pin 30. Moreover, whatever axial extension is required of the coupling means 35, retraction of the servo pin 30 will always be equal to the axial displacement of the actuating piston 33 as it moves from its apply position to its release position.

As should now be apparent, the present invention not only provides a self-adjusting servo mechanism for the operation of a friction band assembly but also accomplishes the other objects of the present invention.

The embodiments of the invention in which an exclusive property or privilege is claimed are defined as follows:

1. A self-adjusting servo mechanism comprising: a housing; said housing presenting a socket cavity; and actuating piston received within said socket cavity; said actuating piston adapted for axial reciprocation through a predetermined distance; a servo pin supported for axial displacement by said housing; a hydraulic coupling means operative to move said servo pin through an axial distance equal to or greater than the axial displacement of said actuating piston; said hydraulic coupling means being axially expandable within a predetermined range in response to the displacement required of said servo pin; a pilot bore provided in said housing; said pilot bore being axially aligned with said socket cavity; said servo pin received within said pilot bore for axial reciprocation; said hydraulic coupling means employs a drive piston; a lost motion device connects said drive piston to said servo pin; an accumulating chamber disposed between said drive and actuating pistons; a pressure chamber; and means to permit unidirectional flow of hydraulic fluid from said pressure chamber into said accumulating chamber.

2. A self-adjusting servo mechanism, as set forth in claim 1, further comprising: a return spring interposed between said housing and said drive piston.

3. A self-adjusting servo mechanism, as set forth in claim 2, further comprising: a cushion spring acting to protract said servo pin with respect to said drive piston.

4. A self-adjusting servo mechanism, as set forth in claim 3, further comprising: means to limit axial displacement of said actuating piston between a release position and an apply position; and, a tickler spring to bias said actuating piston to its apply position.

* * * * *